(12) United States Patent
Hori et al.

(10) Patent No.: US 7,006,291 B2
(45) Date of Patent: Feb. 28, 2006

(54) OPTICAL DEVICE AND METHOD FOR FABRICATING THE SAME

(75) Inventors: Masahiro Hori, Osaka (JP); Teruyuki Sasaki, Osaka (JP); Hiroaki Yamamoto, Osaka (JP); Kentaro Fukuda, Osaka (JP); Kenichi Yamada, Osaka (JP); Toshiaki Anzaki, Osaka (JP); Kenjiro Hamanaka, Osaka (JP); Koichiro Nakamura, Osaka (JP); Masaatsu Kido, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 41 days.

(21) Appl. No.: 10/630,925

(22) Filed: Jul. 31, 2003

(65) Prior Publication Data

US 2004/0105155 A1    Jun. 3, 2004

(30) Foreign Application Priority Data

Jul. 31, 2002  (JP) ............................ P2002-223670
Nov. 11, 2002  (JP) ............................ P2002-326398
Nov. 11, 2002  (JP) ............................ P2002-326399

(51) Int. Cl.
*G02B 1/10*    (2006.01)

(52) U.S. Cl. ...................... 359/580; 359/582; 359/587

(58) Field of Classification Search ................ 359/580, 359/582, 587, 577; 428/426
See application file for complete search history.

(56) References Cited

U.S. PATENT DOCUMENTS 6,582,826 B1 *  6/2003  Goto et al. .................. 428/426
6,822,796 B1 * 11/2004  Takada et al. ............... 359/569

FOREIGN PATENT DOCUMENTS

JP              63-49702          3/1988

\* cited by examiner

*Primary Examiner*—Fayez G. Assaf
(74) *Attorney, Agent, or Firm*—Whitham, Curtis & Christofferson, PC

(57) ABSTRACT

The optical device having a predetermined surface profile of the invention is fabricated by forming a multi-layered dielectric film on the surface of a solid composition layer having a glass transition temperature of not lower than 100° C. The solid composition layer is formed by molding and curing a polymerizable organic group-having fluid composition. The curing may be effected through photopolymerization or thermal polymerization of the polymerizable organic group in the composition, and a predetermined surface profile is transferred onto the composition layer from the mold used. The cured composition is released from the mold, and this is coated with a multi-layered dielectric film.

22 Claims, 1 Drawing Sheet

OPTICAL DEVICE AND METHOD FOR FABRICATING THE SAME

The present invention is based on Japanese Patent Applications Nos. 2002-223670, 2002-326398 and 2002-326399, the entire contents of which are incorporated herein by reference.

BACKGROUND OF THE INVENTION

1. Field of the Invention

The present invention relates to an optical device that is essentially used in the field of optical communication, and to a method for fabricating it. In particular, the invention relates to an optical device having a specific surface profile structure favorable for transmission gratings, Fresnel lenses, microlens arrays and the like, and to a method for fabricating it.

2. Related Art

With the increase in the capacity of information communication in the field of optical communication, many optical devices such as diffraction gratings, microlens arrays and others have become much used therein. These are tabular optical devices that have a predetermined protrusion-groove microstructure profile on their surfaces for utilizing light diffraction or retraction through or on the profile structure thereof.

Various methods are known for forming such a protrusion-groove profile structure profile on the surfaces of tabular optical devices. One method that is preferred for inexpensive and industrial-scale fabrication of the optical devices of the type is a resin forming technique. This comprises uniformly casting a UV-curable resin monomer onto a substrate followed by exposing it to UV light while being kept in contact with a mold having a predetermined protrusion-groove microstructure profile, and the method is disclosed in, for example, Japanese Patent Publication No. JP-A 63-49702.

On the other hand, in optical communication, it is desired to prevent reflected and returning light in optical paths. In addition, it is necessary that the reflection on the surfaces of the optical devices is as small as possible. For such antireflection, a method of forming a multi-layered dielectric film on the surface of an optical device is the most popular.

However, in the resin forming technique mentioned above, the UV-curable monomer shrinks substantially in the step of photopolymerization thereof, and it could not often satisfy the designed dimensional accuracy that is necessary for optical devices. Another problem with the technique is that resin is not resistant to heat, and therefore, the temperature of the substrate on which a multi-layered dielectric film is formed must be kept low. Still another problem is that the quality and the durability of the multi-layered dielectric film are not so good.

SUMMARY OF THE INVENTION

The invention has been made to solve the problems in the related art as described above. One object of the invention is to provide a protrusion-groove microstructure profile of resin of which the thermal shrinkage in molding is minimal and the dimensional accuracy is high. Another object of the invention is to provide an optical device with a multi-layered dielectric film, which has good heat resistance, good desired properties and good durability.

(1) The optical device of the invention is fabricated by processing the surface of a solid composition layer having a glass transition temperature of not lower than 100° C. to thereby make the surface thereof have a predetermined profile structure followed by coating the surface with a multi-layered dielectric film. More preferably, the glass transition temperature of the solid composition layer is not lower than 150° C., even more preferably not lower than 200° C.

Having a glass transition temperature not lower than 100° C., the solid composition is highly resistant to heat and is stable up to the glass transition temperature thereof. Accordingly, the film-forming temperature at which the surface of the substrate is coated with a multi-layered dielectric film may be elevated up to around the glass transition temperature of the solid composition. At such an elevated film-forming temperature, the multi-layered dielectric film formed may have a dense structure, and its heat resistance and moisture resistance may be better.

(2) The optical device of the invention is fabricated by processing the surface of a solid composition layer having a linear thermal expansion coefficient of at most 190 ppm/° C. to thereby make the surface thereof have a predetermined profile structure followed by coating the surface with a multi-layered dielectric film. More preferably, the linear thermal expansion coefficient of the solid composition layer is at most 170 ppm/° C., even more preferably at most 150 ppm/° C.

Having a linear thermal expansion coefficient of at most 190 ppm/° C., the solid composition is deformed little by the ambient temperature change, and therefore the film-forming temperature at which a multi-layered dielectric film is formed on the surface of the solid composition layer-coated substrate may be high. The multi-layered dielectric film formed at such an elevated temperature may have a dense structure, and its heat resistance and moisture resistance may be better.

(3) The optical device of the invention is fabricated by processing the surface of a solid composition layer to thereby make it have a predetermined profile structure followed by coating it with a multi-layered dielectric film, in which the weight reduction in the solid composition layer when heated at a temperature not higher than the glass transition temperature thereof is at most 1.3% by weight. Preferably, the weight reduction in the solid composition layer is at most 1.0% by weight, more preferably at most 0.7% by weight.

The solid composition in which the weight reduction is small when heated at a temperature not higher than the glass transition temperature thereof is resistant to heat and is stable up to the glass transition temperature thereof. Therefore, using the solid composition of the type makes it possible to elevate the film-forming temperature up to nearly the glass transition temperature thereof in the step of coating the solid composition layer with a multi-layered dielectric film. Elevating the film-forming temperature is advantageous in that the multi-layered dielectric film thus formed under the condition may be denser and its heat resistance and moisture resistance are better.

The predetermined surface profile of the optical device of the invention is formed by molding the solid composition, for which, therefore, is used a fluid composition containing a polymerizable organic group, and this is polymerized and cured through exposure to light or thermal energy. The photopolymerization or thermal polymerization for the polymerizable organic group is addition polymerization, and the shrinkage of the film thus cured in that mode is therefore lower than that of the film formed through dehydrating condensation. Accordingly, the photopolymerization or thermal polymerization that is employed in the invention is effective for satisfying the requirement of the dimensional accuracy necessary for optical devices.

Preferably, the polymerizable organic group is an epoxy group, and the fluid composition contains the following components (A), (B), (C) and (D) in the ratio indicated below:

| (A) | non-fluorinated epoxy compound | 20 to 99.9% by weight, |
|---|---|---|
| (B) | polymerization initiator | 0.1 to 7% by weight, |
| (C) | fluorinated epoxy compound | 0 to 79.9% by weight, |
| (D) | silane coupling agent | 0 to 10% by weight. |

Also preferably, the component (A) is an alicyclic epoxy compound.

The polymerizable organic group may be selected from an acryloxy group, a methacryloxy group and a vinyl group.

Preferably, the multi-layered dielectric film is a film having at least two layers (two-layered film) that comprises, as the essential ingredient thereof, a material selected from $SiO_2$, $TiO_2$, $Ta_2O_6$, $ZrO_2$, $Nb_2O_6$ and $MgF_2$. Also preferably, the thickness of each layer of the multi-layered dielectric film falls between 1 and 600 nm. Also preferably, the film does not have grain masses or columnar structures having a diameter of at least 10 nm.

The multi-layered dielectric film in the invention is essentially for antireflection. Formed of the material selected from the above, the multi-layered film may serve as an optically-stable and durable antireflection film. For example, the film may be a two or more multi-layered film of $TiO_2/SiO_2$, $Ta_2O_5/SiO_2$, $ZrO2/SiO_2$, $TiO_2/MgF_2$ or the like, and it is desirable that the film is adequately planned in point of the thickness and the material of each layer thereof, depending on the intrinsic parameters of the film such as the wavelength of light to run through the film and the reflection attenuation of light to return through it. Preferably, in general, the thickness of each layer of the multi-layered dielectric film falls between 1 and 600 nm, more preferably between 10 and 400 nm.

Also preferably, the surface of the solid composition layer that has been polymerized and cured is coated with an $SiO_2$ film having a thickness or from 1 to 200 nm, and the multi-layered dielectric film is formed on it.

The $SiO_2$ film is effective for protecting the surface of the polymerized and cured, solid composition layer and for enhancing the adhesiveness between the solid composition layer and the multi-layered dielectric film. For its effect, the thickness of the $SiO_2$ film preferably falls between 1 and 200 nm, more preferably between 10 and 150 nm.

Preferably, the substrate is at least one selected from glass, ceramics, metal and resin.

The material for the substrate should be selected adequately for preventing the film from being peeled at the interface between the substrate and the film in the process of forming it and for preventing the film from being cracked or damaged.

Also preferably, the substrate in the invention is selected so that it transmits light of which the wavelength falls within a predetermined range. This makes it possible to apply light to the side of the substrate for curing the composition through optical polymerization thereof via the substrate. In that case, in addition, the optical devices thus fabricated may function as transmission optical devices.

Depending on the predetermined surface profile to be formed therein, the optical devices of the invention may function as transmission gratings, Fresnel lenses or a microlens arrays.

The optical device of the invention that has such a predetermined surface profile may be fabricated, for example, in the manner mentioned below.

A polymerizable organic group-having fluid composition is put between a substrate and a mold to be a film hermetically sandwiched therebetween, then this is exposed to at least any one of heat and UV light to be thereby cured, the thus-cured solid composition is thereafter released from the mold, and a multi-layered dielectric film is formed on the surface of the solid composition layer. Preferably, the fluid composition contains a photopolymerization initiator. Containing it, the composition may be cured through photopolymerization. Also preferably, the glass transition temperature of the solid composition layer is not lower than 100° C., as so mentioned hereinabove. Also preferably, the linear thermal expansion coefficient of the solid composition layer at its glass transition temperature is not larger than 190 ppm/° C.

Also preferably, the weight reduction in the solid composition layer, when heated at a temperature not higher than the glass transition temperature thereof, is at most 1.3% by weight.

Preferably in photopolymerization of the composition, at least one of the substrate and the mold is formed of a UV-pervious material, and the composition is exposed to UV light that has passed through the substrate or the mold.

The composition may be uniformly exposed to UV light to give a uniform solid composition layer.

DETAILED DESCRIPTION OF THE PREFERRED EMBODIMENTS

Figure 1A:
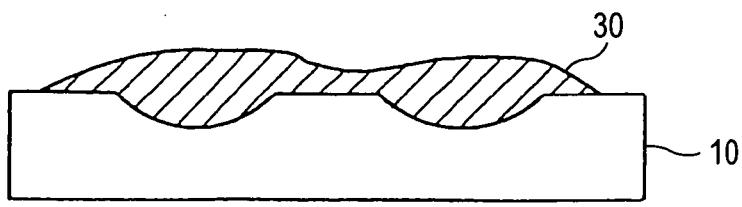
FIGS. 1A through 1D show a process of fabricating the optical device of the invention.

Embodiments of the invention are described in detail hereinunder.

The optical device of the invention comprises a composition layer having a high glass transition temperature, in which the layer is coated with a multi-layered dielectric layer. The composition layer is formed by polymerizing and curing a polymerizable organic group-having fluid compound. For forming a predetermined protrusion-groove surface profile in the optical device, the compound is put between a substrate and a mold to be a film hermetically sandwiched therebetween, then this is exposed to at least any one of both of heat and UV light to be thereby polymerized and cured by the energy of the heat or light. Then, the thus-cured solid composition is released from the mold, and then optionally heated whereby the reversed surface profile of the mold is transferred onto the surface of the composition. Further, a multi-layered dielectric film is formed on the surface of the solid composition layer to complete the optical device of the invention. Preferably, the multi-layered dielectric film in the optical device of the invention has a small linear thermal expansion coefficient, and also preferably, the weight reduction in the film under heat is small.

As so mentioned hereinabove, the compound for the solid composition layer must have at least one polymerizable organic group in the molecule. The photopolymerization of the compound is induced by the addition polymerization of the radical or cation that is formed through photolysis of the polymerization initiator combined with the compound, to the polymerizable organic group of the compound. Accordingly, as compared with that in dehydrating condensation, the shrinkage of the photopolymerized compound is small and the compound may instantaneously form a chemically-bonded uniform film. In thermal polymerization, the polymerization initiator begins to act through pyrolysis. Accordingly, in the invention, the polymerizable organic group in the compound for the solid composition layer is preferably one that is polymerized through exposure to light or heat.

Examples of the photopolymerizable organic group are an epoxy group, an acryloxy group, a methacryloxy group, a vinyl group, and organic groups containing any of them. Examples of the thermally-polymerizable organic group are an epoxy group, a vinyl group, and organic groups containing any of them. When the polymerizable organic group is an epoxy group, then the compound must contain at least one such group in the molecule; but when the polymerizable organic group is an acryloxy group, a methacryloxy group or a vinyl group, then the compound must contain at least two such groups in one molecule.

Examples of the epoxy group-having polymerizing compound are liquid epoxy compounds such as alicyclic epoxy compounds, aromatic epoxy compounds and fluorinated epoxy compounds. Examples of the alicyclic epoxy compounds are those of chemical formulae (1) to (7) mentioned below.

Of those, the following compounds (1) to (6) are preferred, since they are easy to handle because of their good heat resistance, good chemical resistance and good liquid viscosity, and since they are readily cured and their starting compounds are readily available.

3,4-Epoxycyclohexylmethyl
(3,4-epoxycyclohexane)carboxylate of formula (1):

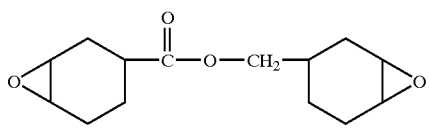

Vinylcyclohexenediepoxide of formula (2):

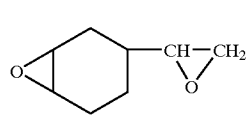

3,4-Epoxy-6-methylcyclohexylmethyl
3,4-epoxy-6-methylcyclohexanecarboxylate of formula (3):

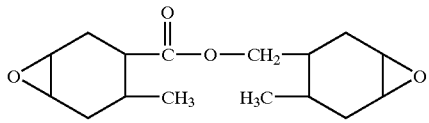

Bis(3,4-epoxy-6-methylcyclohexylmethyl) adipate of formula (4):

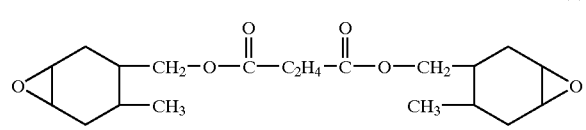

Dicyclopentadieneoxide of formula (5):

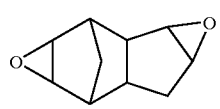

Bis(2,3-epoxycyclopentyl) ether, limonenedioxide of formula

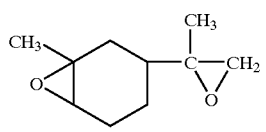

In addition, other compounds of the following formulae (7) are also usable in the invention.

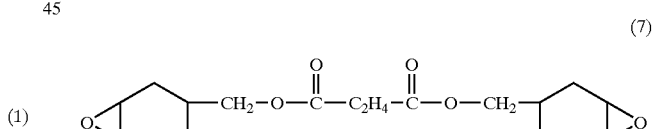

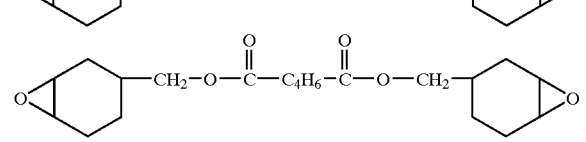

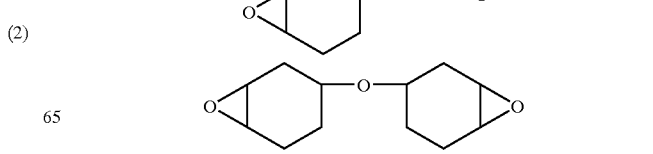

-continued

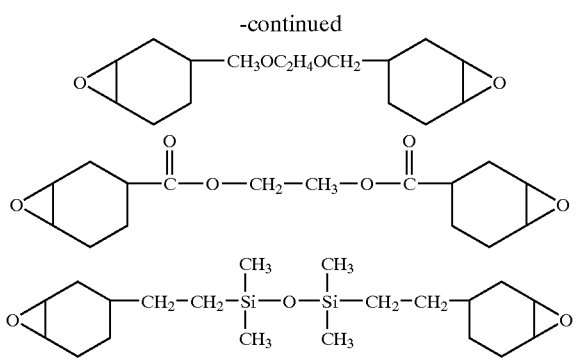

Examples of the aromatic epoxy compounds are those of the following general formula (8):

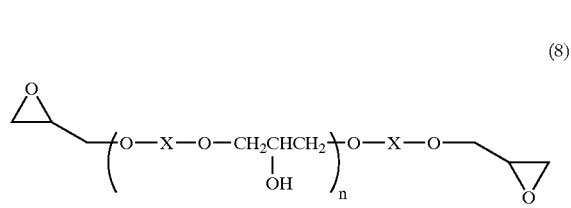

wherein X is a group of any of chemical formulae (9) to (14) mentioned below.

Bisphenol A-type compound with a group of formula (9):

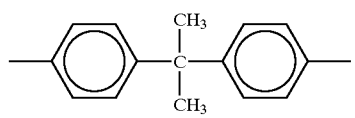

Bisphenyl compound with any of the following formula (10):

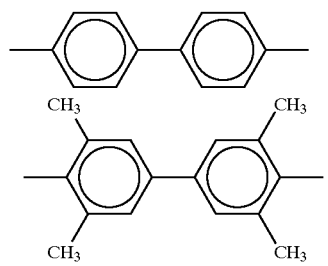

Bisphenol F-type compound with a group of formula (11):

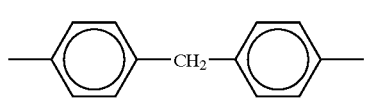

Diphenyl ether compound with a group of formula (12):

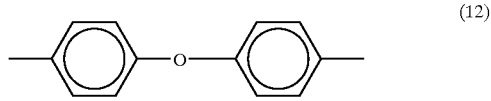

Bisphenol S-type compound with a group of formula (13):

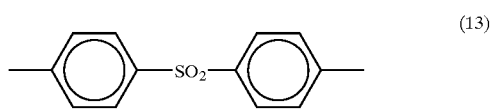

Other compounds with any of the following formula (14):

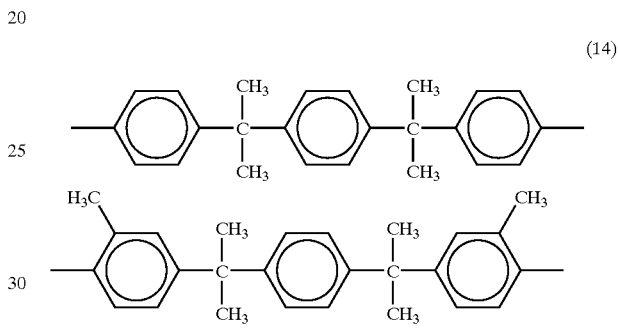

These are preferred for use herein, since they are easy to handle because of their good heat resistance, good chemical resistance and good liquid viscosity, and since they are readily cured and their starting compounds are readily available.

Examples of the fluorinated epoxy compounds are those of the following general formula (15):

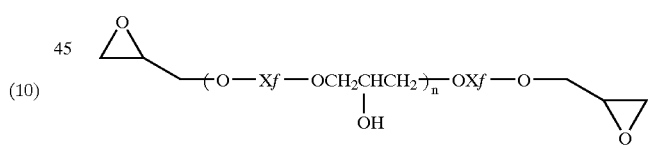

wherein Xf is a group of any of chemical formulae (16) and (17) mentioned below, and Z represents an alkyl group.

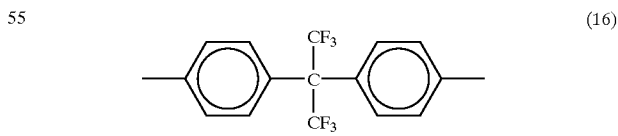

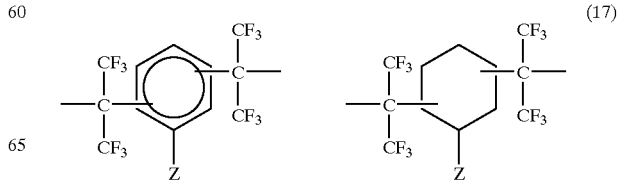

-continued

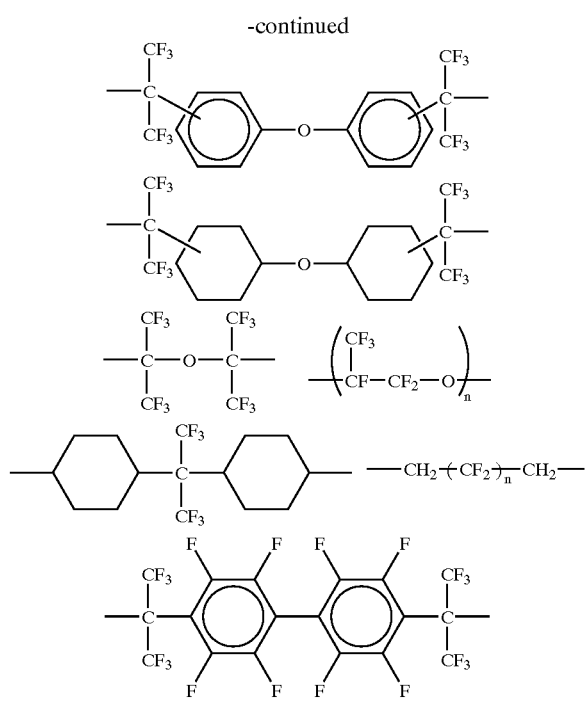

Further mentioned for use herein are compounds of the following general formula (18) in which R represents a group of the chemical formula (19) mentioned below.

$$\text{(18)}$$

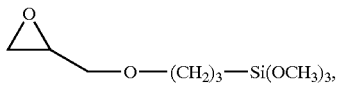

$$\text{(19)}$$

R: —(CF$_2$)$_n$  R: —(CF$_2$)$_n$CF(CF$_3$)$_2$  R: —O(CH$_3$)$_n$(CF$_2$)$_m$H
R: —(CF$_2$)$_m$CF=CF$_2$  R: —(CF$_2$)$_m$CF=CH$_2$
R: —(CF$_2$)$_m$CFOCF$_2$CF=CH$_2$
       |
       CF$_3$

The refractive index of the cured products of the fluorinated epoxy compounds is lower than that of the cured products of the alicyclic epoxy compounds or the aromatic epoxy compounds. Therefore, the fluorinated epoxy compound may be mixed with any other liquid epoxy compound for controlling the refractive index of the cured products of the mixture. In addition, since the cured products of the fluorinated epoxy compounds have good water repellency and oil repellency, the compounds are effective for improving the moisture resistance and the chemical resistance of the solid composition layer of the optical device of the invention. One or more of these epoxy compounds may be used herein either individually or combined.

For improving the adhesiveness of the solid composition layer to the substrate and for improving the moisture resistance of the layer, a silane coupling agent may be added to the composition. The silane coupling agent includes, for example, 3-glycidoxypropyltrimethoxysilane of a formula (20):

$$\text{(20)}$$

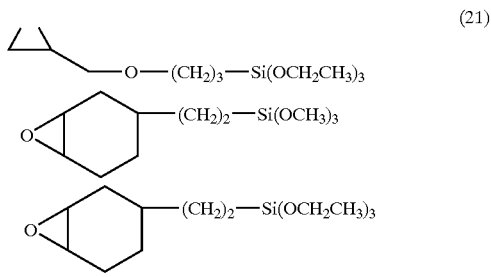

and 3-glycidoxypropyltriethoxysilane, 2-(3,4-epoxycyclohexylethyltrimethoxysilane), and 2-(3,4-epoxycyclohexylethyltriethoxysilane) (these are in the following formula (21)).

$$\text{(21)}$$

The amount of the silane coupling agent in the fluid composition may be at most 10% by weight of the composition.

Examples of the acryloxy group-having organic group are an acryloxy-substituted alkyl group such as an acryloxypropyl group, and an acryloxy-substituted hydroxyalkyl group. Examples of the methacryloxy group-having organic group are a methacryloxy-substituted alkyl group, a methacryloxyethoxy group, and a methacryloxypolyethylene group.

Examples of the vinyl group-having organic group are a vinylbenzyloxy group, an N-vinylformamido group, and a vinyloxy group. Examples of the epoxy group-having organic group are an epoxy-substituted propoxy group, an epoxycyclohexylethyl group, and an epoxyethylphenyl group. Fluorinating the hydrogen atom in the organic group results in further improvement in the waterproofness and the heat resistance of the optical device.

In the case where the polymerizable organic group in the fluid composition is photopolymerizable, a photopolymerization initiator is added to the composition. Examples of radical photopolymerization initiators usable herein are [2-hydroxy-2-methyl-1-phenylpropan-1-one] (this is abbreviated as S1—the same shall apply hereinunder), [1-(4-isopropylphenyl)-2-hydroxy-2-methylpropan-1-one] (S2), [4-(2-hydroxyethoxy)phenyl-(2-hydroxy-2-propyl)ketone] (S3), [2,2-dimethoxy-1,2-diphenylethan-1-one] (S4), [1-hydroxy-cyclohexyl-phenyl-ketone] (S5), [2-methyl-2-[4-(methylthio)phenyl]-2-morpholinopropan-1-one] (S6), [bis(2,6-dimethoxybenzoyl)-2,4,4-trimethylpentyl-phosphine oxide] (S7), and [2-benzyl-2-dimethylamino-1-(4-morpholinophenyl)-butanone-1] (S8).

Examples of cationic photopolymerization initiators also usable herein are phenyl [m-(2-hydroxytetracyclo)phenyl] iodonium hexafluoroantimonate (S9), and diphenyliodonium tetrakis(pentafluorophenyl)borate (S10). Preferably, the amount of the photopolymerization initiator to be the composition is from 0.1 to 7% by weight of the composition.

The predetermined surface profile of the optical device of the invention is formed by molding the resin composition. Therefore, the polymerizable organic group-having compound for the composition must be fluid, and its viscosity preferably falls between 3 and 2500 mPa·m, more preferably between 100 and 1500 mPa·m, most preferably between 100 and 1000 mPa·m.

The essential object of the multi-layered dielectric film to be in the optical device of the invention is for antireflection on the surface of the device. For realizing the necessary antireflection property thereof, the optical device has a two or more multi-layered film of $TiO_2/SiO_2$, $Ta_2O_5/SiO_2$, $ZrO_2/SiO_2$, $TiO_2/MgF_2$ or the like, and it is desirable that the film is adequately planned in terms of the thickness and the material of each layer thereof, depending on the intrinsic parameters of the film such as the wavelength of light to run through the film and the reflection attenuation of light to return through it. Preferably, in general, the thickness of each layer of the multi-layered dielectric film falls between 1 and 600 nm, more preferably between 10 and 400 nm.

Denser films are more durable. Therefore, it is desirable that the film is formed more uniformly and more densely, for example, in a mode of sputtering or vacuum evaporation. In addition, in view of the moisture resistance of the multi-layered dielectric film, the temperature at which the film is formed preferably falls between 50 and 250° C., more preferably between 80 and 250° C.

For protecting the surface profile of the solid composition layer formed on the substrate and for enhancing the adhesiveness between the solid composition layer and the antireflection film formed on it, it is desirable that an $SiO_2$ film is additionally formed between the solid composition layer and the multi-layered dielectric layer. Any material other than $SiO_2$ may be selected for the interlayer. Preferably, the thickness of the interlayer is from 1 to 300 nm, more preferably between 10 and 150 nm.

For fabricating the optical device of the invention that has a predetermined surface profile as described above, there are two typical methods mentioned below.

One method (hereinafter referred to as a mold casting method) comprises casting a fluid composition onto a mold and degassing it. Next, the mold with the composition thereon is joined with a substrate, and heated or exposed to UV light. Through this, the composition is cured. The cured composition is released from the mold, and then this is optionally heated.

The method is described in more detail with reference to FIGS. 1A through 1D. A mold 10 having a predetermined protrusion-groove microstructure profile on its surface is kept horizontal with the face of the mold being kept upward. Then, a fluid composition 30 having a viscosity of from 100 to 1000 mPa·m is cast onto the mold 10 so that the recesses of the mold are filled with the composition (FIG. 1A). In place of casting the fluid composition thereonto, the mold may be dipped in a bath of the fluid composition, or the fluid composition may be applied onto the mold by the use of a coating brush.

In that condition in which it is protected from air penetration thereinto, the fluid composition 30 filled on the mold 10 is kept at a temperature falling between room temperature and 100° C. or so under a reduced pressure of from 2 to 5 Pa for 5 to 10 minutes. In this stage, the fluid composition may be degassed to remove the bubbles and the dissolved oxygen from it.

Figure 1B:
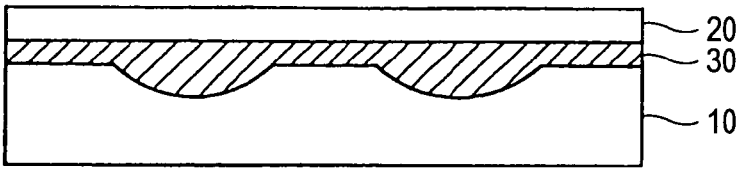

Next, a substrate 20 is brought into contact with the fluid composition 30 on the mold 10 in such a controlled condition that no space exists between the fluid composition 30 and the surface of the substrate 10, whereby a layer of the fluid composition 30 is sandwiched between the substrate 20 and the mold 10 (FIG. 1B). In the condition shown in FIG. 1B, the stacked arrangement is kept at 20 to 100° C. for 1 to 30 minutes while being exposed to UV light, or is heated at 140 to 180° C. and kept as such for 10 to 120 minutes to thereby polymerize and cure the fluid composition.

Figure 1C:
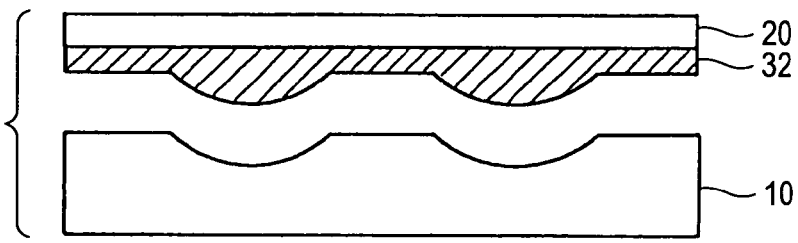
Figure 1D:
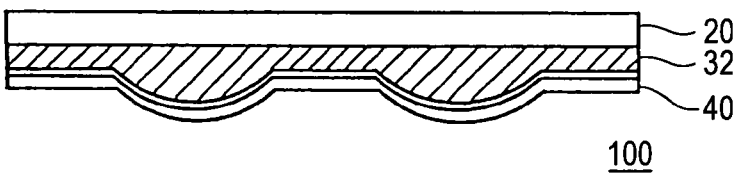

In the case where the composition is exposed to UV light, at least one of the substrate 20 and the mold 10 shall be formed of a UV-pervious material. Next, the mold 10 is peeled to release the cured product from it. The process gives a solid composition layer 32 which has a reversed protrusion-groove microstructure profile corresponding to but reversed from the protrusion-groove surface profile of the mold 10 and which has a high glass transition temperature, formed and bonded to the surface of the substrate 20 (FIG. 1C).

Optionally, the cured product is finally heated under ordinary pressure or a reduced pressure of from 2 to 5 Pa at 100 to 200° C. for 15 to 250 minutes, whereby the polymerization initiator and the non-polymerized monomer that may remain in the solid composition layer are vaporized away. Thus processed, the solid composition layer may shrink a little in the direction of the thickness thereof to be a denser film. The thus-formed solid composition layer 32 that has a predetermined surface profile structure is coated with a multi-layered dielectric film 40, as in FIG. 1D, to give an optical device 100 of the invention.

Another method (hereinafter referred to as a substrate casting method) comprises casting a fluid composition directly on the surface of a substrate, then degassing it, and thereafter pressing a mold against the fluid composition on the surface of the substrate, and exposing it to UV light or heat in that condition for transfer molding the composition. After this, the cured product is released from the mold and then optionally subjected to a final heating treatment.

The second method is the same as the first method except the process after the step in FIG. 1B. Concretely, the surface of the substrate to be coated is kept horizontal, and a fluid composition having a viscosity of from 100 to 1000 mPa·m is cast onto the substrate and spread to form thereon a layer having a predetermined thickness. In that condition in which it is protected from air penetration thereinto, the fluid composition is kept at a temperature falling between room temperature and 100° C. under a reduced pressure of from 2 to 5 Pa for 5 to 10 minutes. In this stage, the fluid composition may be degassed to remove the bubbles and the dissolved oxygen from it.

Next, a mold having a predetermined protrusion-groove microstructure profile is pressed against the layer of the fluid composition and kept as such under a pressure of from 0.5 to 120 kg/cm$^2$ at a temperature of from 20° C. to 150° C. for 60 seconds to 60 minutes; or while the mold is pressed against the fluid composition layer under the pressure as above, the composition layer is exposed to UV light in such a controlled manner that the irradiation intensity at the site of the layer to be cured may fall between 1.0 and 120 mW/cm2, and kept at a temperature of from 20 to 100° C. for 60 seconds to 30 minutes. Thus processed, the polymerization of the fluid composition is almost completed, and the composition layer is thus cured.

Where the composition is exposed to UV light, at least one of the substrate and the mold shall be formed of a UV-pervious material. Next, the mold is peeled to release the cured product from it. The process gives a solid composition layer which has a reversed protrusion-groove microstructure profile corresponding to but reversed from the protrusion-groove surface profile of the mold, formed and bonded to the surface of the substrate.

Optionally, this is heated, for example, under ordinary pressure or a reduced pressure of from 2 to 5 Pa at 180 to 250° C. for 15 to 350 minutes, whereby the polymerization initiator and the non-polymerized monomer that may remain in the layer are vaporized away. Thus processed, the solid composition layer may shrink a little in the direction of the thickness thereof to be a denser film.

The thus-formed solid composition layer that has a predetermined surface profile structure is coated with a multi-layered dielectric film to give an optical device of the invention.

The outermost surface of the mold to be used in the invention is preferably coated with a release film of fluororesin or gold (Au). The fluororesin may be uniformly applied to the mold in a mode of spin coating or dipping. Gold is an excellent material for the release film for the mold, since its releasability, mechanical strength against pressure, heat resistance, corrosion resistance and oxidation resistance are all good. Preferably, the thickness of the release film is from 200 to 1000 nm, more preferably from 400 to 600 nm. Release films having a smoother surface have better releasability. In the invention, therefore, it is desirable that the release film is formed uniformly and smoothly on the mold in a mode of sputtering, vacuum evaporation, electroless plating, electrolytic plating or foil lamination.

Preferably, the expansion coefficient of the core material for the mold is similar to that of the release film. Resin molds have the advantages in that they may be readily processed to have microstructures and may also be readily processed to have a desired shape; while glass or metal molds have the advantages in that they have good heat resistance and high mechanical strength and their durability is high.

The mold for use in the invention shall have grooves or protrusions formed on its surface. Regarding the protrusion-groove profile of the mold, for example, there are mentioned various types of spherical, conical or angular conical profiles, as well as slits of various cross-sectional profiles. Concretely, any desired numbers of spherical, conical or angular conical profiles may be formed entirely or partially in the release film on the mold. On the other hand, when grooves are formed as slits, the slits may be any of linear or curved ones, and their number may be any desired one. When multiple slits are formed, they may be in any form of concentric circles or lattices.

According to the invention as mentioned above, a film having a protrusion-groove surface profile is formed on a planar tabular or curved tabular substrate, in which the film has a glans transition temperature of not lower than 100° C. and its surface has a protrusion-groove microstructure profile formed at a predetermined protrusion-groove pitch of, for example, from 1 µm to 500 µm to have a predetermined height of from 5 to 500 µm and in which the maximum thickness of the film (measured at the surface protrusion of the film) is from 1 µm to 1 mm, preferably from 20 to 150 µm. Preferably, the film has a linear thermal expansion coefficient of at most 190 ppm/° C., and its weight reduction under heat at a temperature not higher than the glass transition temperature thereof is at most 1.3% by weight.

The film is highly flexible (that is, it is not brittle), and its mechanical strength is high, and the film is therefore hardly cracked. In addition, any foam that may be formed during molding is not found inside the film, and the film shrinks minimally while molded. Accordingly, the film realizes extremely excellent transferability and the dimensional accuracy in forming the protrusion-groove microstructure profile on the film surface is extremely high. Concretely, for example, when a large number of protrusions having a height of from 20 to 100 mm are formed, the height fluctuation in the film surface protrusions is at most 1 mm. In addition, the misregistration between the neighboring protrusions in the film surface from the pattern of the mold falls within a range of measurement error (at most 0.2 mm).

The form of the substrate for use in the invention is not specifically defined, and it may be tabular or curved. Preferably, however, the degree of warp of the substrate surface at 200° C. and 20° C. (the length of thermal deformation in the direction vertical to the surface of the substrate within a unit length thereof in the direction running along the surface of the substrate) falls within ±5 µm/cm. If the degree of warp of the substrate is over the range, then the film may peel from the substrate or may crack while it is formed. Therefore, taking the parameters into consideration, it is desirable to select and determine the material, the size and the shape of the substrate.

Preferably, the linear expansion coefficient of the substrate is at most $1.5 \times 10^{-6}$ $C.^{-1}$. If the linear expansion coefficient of the substrate is over $1.55 \times 10^{-5}$ $C.^{-1}$, for example, when the substrate is formed of a plastic having a large thermal expansion coefficient such as polypropylene (9 to $15 \times 10^{-6}$ $C.^{-1}$), then the film may peel from the substrate or may crack while it is formed of a composition to give the film.

Ordinary inorganic glass has a linear expansion coefficient of at most $1.5 \times 10^{-5}$ $C.^{-1}$. Preferably, at least the surface of the substrate is an oxide. If the surface of the substrate that is to be kept in contact with a composition to form a film thereon is not an oxide, the adhesion strength of the film may lower while the film is formed of the composition, and, as the case may be, the film formed may delaminate from the substrate at their interface.

Preferred examples of the material for the substrate are oxide glass such as silicate glass, borate glass, phosphate glass; quartz, ceramics, silicon, aluminium and other metals, epoxy resins, glass fibers-reinforced polystyrene. If not specifically processed, metal could not receive a composition layer (organopolysiloxane film) thereon. When the surface of metal is processed with an oxidizing agent, then it may be used as the substrate herein.

Where a transparent substrate that is pervious to light in service for optical devices of the invention, for example, visible light, UV light or IR light is used for the substrate in he invention, then the optical devices of the invention may function as transmission optical devices such as lens arrays, diffraction gratings (e.g., echelette gratings, echelon gratings, echelle gratings), Fresnel lenses and others.

The steps in the process of fabricating the optical device having a predetermined surface profile of the invention are described more concretely hereinunder.

(Application of Solution to Mold or Substrate)

In a mold casting method, a photocurable or thermosetting fluid composition is cast onto a transparent mold to form thereon a layer having a thickness of from 50 µm to 1 mm (and having a viscosity of 200 mPa·m). The same shall apply also to a substrate casting method.

(Bonding, Exposure, and Release from Mold)

In the mold casting method, the fluid composition is kept in contact with the surface or a substrate put thereon, and the fluid composition is thus spread under pressure between the mold and the substrate. In that condition, the composition is exposed to UV light for 0.5 to 30 minutes so that it is bonded to the substrate. After the composition has been completely cured, the mold is removed from the substrate and the cured product is thus released from the mold.

In the substrate casting method, a transparent mold is kept pressed against the coating film, and this is exposed to UV light for 0.5 to 30 minutes in the same manner as above so that the substrate is bonded to the cured composition. Then, this is released from the mold.

In any of the methods mentioned above, the solid composition layer formed and bonded to the surface of the substrate has a protrusion-groove microstructure profile transferred from the pattern of the mold.

(Final Heat Set)

The heating condition for increasing the density of the solid composition layer thus formed and released from the mold is heating the cured product at 150° C. for 60 minutes.

(Formation of Multi-Layered Dielectric Film)

Using $SiO_2$ and $TiO_2$ as the material for the dielectric film, these are deposited on the cured product in a mode of vacuum evaporation. The temperature of the substrate (solid composition layer) is 150° C.

(Determination of Protrusion Height Fluctuation)

The protrusion height fluctuation in the outermost layer of the thus-fabricated optical device is determined through laser microscopy.

(Determination of Heat Resistance, Moisture Resistance, Optical Properties)

The optical device thus fabricated herein is subjected to a test for heat resistance and moisture resistance at 85° C., 85% and 500 hours. It is then restored to room temperature, and is checked for cracks. Based on this, the optical device thus tested is evaluated for the heat resistance and the moisture resistance thereof. In case where the optical device is a microlens, it is subjected to spectrometry with an interferometer (He—Ne laser, λ=633 nm) to measure the spherical aberration thereof and the absolute reflection spectrum thereof at an incident angle of 12° to the substrate surface. The wavelength shift of the minimum value of the data is measured before and after the heat resistance/moisture resistance test. Based on it, the sample tested is evaluated for the characteristic deterioration thereof. In addition, using an Abbe's refractiometer, the d-ray refractive index of the film part of the sample is measured.

(Determination of Weight Reduction in Heating)

The weight reduction in the composition in heating is determined as follows: A fluid composition to be tested is dropped onto a glass substrate and spread thereover, and then this is exposed to UV light or heat so as to be completely cured. Its weight is measured at room temperature. Next, this is heated at a processing temperature not higher than the glass transition temperature of the composition (in this, the temperature is 85° C. as in the heat resistance test as above), and kept in air for a predetermined period of time (in this, the time is twice that in the above-mentioned heat-resistance and moisture-resistance test, and is 1000 hours), and its weight is again measured at room temperature. The weight change before and after heating treatment is calculated as the weight loss ratio to the solid composition weight, and it indicates the weight reduction (% by weight) in the cured composition layer.

Examples of the optical device of the invention are described below.

(Description of Molding Composition)

(Molding Composition A) 94 parts by weight of a non-fluorinated epoxy compound, alicyclic epoxy compound of formula (1), 1 part by weight of a polymerization initiator, cationic initiator (S9), and 5 parts by weight of a silane coupling agent of formula (20) were mixed to prepare a molding composition A.

(Molding Composition B) 50 parts by weight of a non-fluorinated epoxy compound, alicyclic epoxy compound of formula (2), 38 parts by weight of an aromatic epoxy compound of formula (9), 10 parts by weight of a fluorinated epoxy compound of formula (16), and 2 parts by weight of a polymerization initiator, cationic initiator (S9) were mixed to prepare a molding composition B.

(Molding Composition C1) 97 parts by weight of an acrylic compound and 3 parts by weight of a radical photopolymerization initiator were mixed to prepare a molding composition C1.

(Molding Composition C2) 48 parts by weight of a non-fluorinated epoxy compound, alicyclic epoxy compound of formula (2), 49 parts by weight of a fluorinated epoxy compound of formula (16), 1parts by weight of a polymerization initiator, cationic initiator (S9) and 1 part by weight of a silane coupling agent of formula (20) were mixed to prepare a molding composition C2.

EXAMPLE 1

Figure 2:
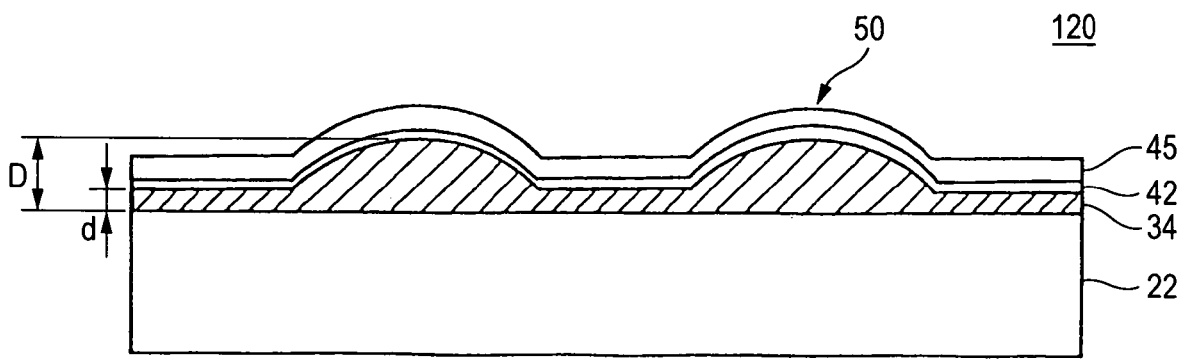
FIG. 2 is a schematic view showing one embodiment of the optical device of the invention for a microlens array.

An antireflection film-coated, convex lens array of resin 120 was formed on a glass substrate 22, as in FIG. 2. The glass substrate 22 is a quartz glass substrate having a thickness of 3.0 mm and a square size of 50 mm×50 mm (having a linear expansion coefficient of $5.5 \times 10^{-7}$° $C.^{-1}$), and this was ultrasonically washed with alkali and further washed with pure water. For the molding resin, herein used was the molding composition A, of which the glass transition temperature Tg is 230° C. after cured. According to a mold casting method, a film was formed on one surface of the quartz glass substrate and a protrusion-groove microstructure profile was formed thereon. The linear thermal expansion coefficient of the molding composition A is 106 ppm/° C., after cured. The cured resin was kept at 85° C. for 1000 hours, and then the weight reduction therein was previously determined, and it was 0.6% by weight.

The mold used herein is as follows: This is a mold formed of glass (having a thickness of 5 mm and a size of 50 mm×50 mm), and 50 semi-spherical grooves are densely formed both in the machine direction and in the cross direction in its surface, totaling about 2500 semi-spherical grooves therein. Each semi-spherical groove in it has a radius of curvature of 1.75 mm, a lens diameter of 1.0 mm and a groove depth of 73 μm. For improving the mold releasability thereof, the surface of the mold was coated with a fluororesin film formed in a spin coating method.

The molding composition A was applied to the mold so that the thickness of its layer could be about 100 μm. This was exposed to UV light from the side of the substrate at room temperature for 3 minutes. The light intensity was 120 mW/$cm^2$. After this was released from the mold, it was finally heated at 150° C. for 60 minutes.

Thus molded, the thickness, d, of the thinnest region of the cured film 34 of the organic polymerizable resin was about 20 μm; and the maximum thickness, D, from the top of the spherical protrusion was 91.5 μm. The film was transparent, and its refractive index was 1.50. The film contained a polymerized epoxy moiety, [—$(CH_2)_3$OCO$(CH_2)_4$COO$(CH_2)_3$—].

Next, the substrate was heated up to 200° C., and an adhesion-reinforcing layer 42 of SiO$_2$ (100 nm) was formed through vapor deposition. Immediately after it, an antireflection film 45 of TiO$_2$ (74.8 nm)/SiO$_2$ (64.8 nm)/TiO$_2$ (189.7 nm)/SiO$_2$ (266.5 nm) was formed.

The focal distance of the microlenses 50 was from 3.297 to 3.300 mm.

100 convex lenses were randomly selected in the microlens array, and their dimensions were measured. The mean height was 71.5 μm, and the standard deviation was 0.12 μm. Calculated from these data, the shrinkage of the cured film was about 2%, and the spherical aberration of the microlenses 50 measured with He—Ne laser ($\lambda$=633 nm) was RMS=0.05$\lambda$ with a standard deviation or 0.001$\lambda$.

The microlens array was tested for the heat resistance and the moisture resistance thereof. After the test, the film was neither cracked nor peeled, and the focal distance of all convex lenses fell within a range of from 3.297 to 3.300 mm. This means no change in the focal distance before and after the test. Parallel rays were made to vertically enter the microlens array from the side opposite to the film-coated side thereof, and the diameter of the condensed spot was measured. As a result, the diameter of the condensed spot of every convex lens was not larger than 3 μm, and this did not change before and after the test.

For evaluating the characteristics of the antireflection film thereof, the device fabricated herein was analyzed through spectrometry to measure the reflection spectrum thereof. No change was found in the minimum value. Observing the cross section of the antireflection film of the device by the use of a scanning electronic microscope revealed that the film was dense and had neither grain masses nor columnar structures having a size or 10 nm or more.

COMPARATIVE EXAMPLE 1

A microlens array was fabricated in the same manner as in Example 1 using the same substrate and the same mold as in Example 1. In this, however, an acrylic acid monomer that had a Tg of 30° C. after being cured was used in the absence of a solvent, in place of the molding composition A used in Example 1.

The thickness of the thinnest region in the film thus formed herein was about 35 μm. An antireflection film was formed on this film, but it cracked. 100 convex lenses were randomly selected in the microlens array, and their dimensions were measured. As a result, the mean shrinkage of the film was 6%, and this is larger than that in Example 1.

The spherical aberration of the device fabricated herein and measured in the same 100-point measurement method as above was RMS=0.3$\lambda$ with a standard deviation of 0.01$\lambda$. This means that the spherical-aberration herein is large (6 times) and its standard deviation is also large (10 times) as compared with those in Example 1. In addition, the microlenses herein formed were not spherical and their distribution was great, and, therefore, the shape of the condensed spots was not good and the condensed spot diameter was 10 μm. Further, the focal distance fluctuation was great, varying from 2.900 to 3.600 mm. In addition, the device fabricated herein was tested for the heat resistance and the moisture resistance thereof in the same manner as in Example 1. As a result, the cured film was cracked and peeled, and much deformed. After the test, the focal distance and the spherical aberration could not be measured.

EXAMPLE 2

A microlens array was fabricated in the same manner as in Example 1, for which, however, a molding composition B to have Tg of 170° C. after cured was used. The molding composition B has a linear thermal expansion coefficient of 117 ppm/° C. after cured. The thickness of the thinnest region of the array was about 50 μm. Like in Example 1, an antireflection film was formed on it, at a substrate temperature of 150° C. The film formed was good, and no crack was found therein.

The focal distance of the microlens was from 3.297 to 3.300 mm. 100 convex lenses were randomly selected in the microlens array, and their dimensions including the height of the convex lens part were measured. The mean height was 71.5 μm, and the standard deviation was 0.12 μm. Calculated from these data, the shrinkage of the cured film was about 2%, and the spherical aberration of the microlenses measured with He—Ne laser ($\lambda$=633 nm) was RMS=0.05$\lambda$ with a standard deviation of 0.001$\lambda$.

The microlens array was tested for the heat resistance and the moisture resistance thereof. After the test, the film was neither cracked nor peeled, and the focal distance of all convex lenses fell within a range of from 3.297 to 3.300 mm. This means no change in the focal distance before and after the test. Parallel rays were made to vertically enter the microlens array from the side opposite to the film-coated side thereof, and the diameter of the condensed spot was measured. As a result, the diameter of the condensed spot of every convex lens was not larger than 3 μm, and this did not change before and after the heat resistance and moisture resistance tests. For evaluating the characteristics of the antireflection film thereof, the device fabricated herein was analyzed through spectrometry to measure the reflection spectrum thereof. The minimum value changed by 20 nm.

EXAMPLE 3

A protrusion-groove microstructure was fabricated in the same manner as in Example 1, for which, however, a molding composition C1 to have Tg of 128° C. after cured was used. The thickness of the thinnest region of the structure was about 50 μm. Like in Example 1, an antireflection film was formed on it, at a substrate temperature of 120° C. The film formed was good, and no crack was found therein.

The focal distance of the microlens of this structure was from 3.300 to 3.303 mm. 100 convex lenses were randomly selected in the film-coated, protrusion-groove microstructure, and their dimensions including the height of the convex lens part were measured. The mean height was 72.3 mm, and the standard deviation was 0.13 mm. Calculated from this data, the shrinkage of the cured film was about 2%, and the spherical aberration of the microlenses measured with He-Ne laser (1 =633 nm) was RMS=0.05 1 with a standard deviation of 0.001 1.

The microstructure was tested for the heat resistance and the moisture resistance thereof. After the test, the film was neither cracked nor peeled, and the focal distance of all convex lenses fell within a range of from 3.300 to 3.303 mm. This means no change in the focal distance before and after the test. Parallel rays were made to vertically enter the microlens array from the side opposite to the film-coated side thereof, and the diameter of the condensed spot was measured. As a result, the diameter of the condensed spot of every convex lens was not larger than 3 μm, and this did not change before and after the test. For evaluating the characteristics of the antireflection film thereof, the device fabricated herein was analyzed through spectrometry to measure the reflection spectrum thereof. The minimum value changed by 50 nm.

EXAMPLE 4

A protrusion-groove microstructure was fabricated in the same manner as in Example 1, for which, however, a molding composition C2 to a linear thermal expansion coefficient of 146 ppm/° C. after cured was used. The thickness of the thinnest region of the structure was about 50 μm. Like in Example 1, an antireflection film was formed on it, at a substrate temperature of 120° C. The film formed was good, and no crack was found therein. The weight reduction in the resin kept at 85° C. for 1000 hours was 0.1% by weight.

The focal distance of the microlens of the microlens was from 3.300 to 3.303 mm. 100 convex lenses were randomly selected in the film-coated, protrusion-groove microstructure, and their dimensions including the height of the convex lens part were measured. The mean height was 72.3 μm, and the standard deviation was 0.13 μm. Calculated from these data, the shrinkage of the cured film was about 2%, and the spherical aberration of the microlenses measured with He—Ne laser (λ=633 nm) was RMS=0.05λ with a standard deviation of 0.001λ.

The microstructure was tested for the moisture resistance thereof. After the test, the film was neither cracked nor peeled, and the focal distance of all convex lenses fell within a range of from 3.300 to 3.303 mm. This means no change in the focal distance before and after the moisture resistance test. Parallel rays were made to vertically enter the microlens array from the side opposite to the film-coated side thereof, and the diameter of the condensed spot was measured. As a result, the diameter of the condensed spot of every convex lens was not larger than 3 μm, and this did not change before and after the moisture resistance test.

For evaluating the characteristics of the antireflection film thereof, the device fabricated herein was analyzed through spectrometry to measure the reflection spectrum thereof. The minimum value changed by 20 nm.

The data in the Examples mentioned above confirm that the lenses formed of a resin having a linear thermal expansion coefficient of at most 150 ppm/° C. all have good weather resistance including the antireflection film thereof. Resins having a linear thermal expansion coefficient of at most 170 ppm/° C. are effective for realizing the advantages as above; and those having a linear thermal expansion coefficient of at most 190 ppm/° C. are acceptable for practical use. The resins of the type are not limited to convex lenses but are applicable to any others such as transmission gratings and Fresnel lens optical devices of good weather resistance, depending on the predetermined surface profile formed thereon.

Further, the data in the Examples mentioned above confirm that the lenses formed of a resin of which the weight reduction in heat treatment at a temperature not higher than the glass transition temperature thereof is at most 0.7% by weight all have good weather resistance including the antireflection film thereof. Resins of which the weight reduction in heating is at most 1.0% by weight are effective for realizing the advantages as above; and those of which the weight reduction in heating is at most 1.3% by weight are acceptable for practical use. The resins of the type are not limited to convex lenses but are applicable to any others such as transmission gratings and Fresnel lens optical devices of good weather resistance, depending on the predetermined surface profile formed thereon.

As described hereinabove, the invention provides an optical device of which the advantages are that its glass transition temperature is high, as well as its linear thermal expansion coefficient and its weight reduction in heating are small. The thermal shrinkage in film formation is small and its surface has a protrusion-groove microstructure profile of high dimensional accuracy. Concretely, the optical device of the invention is applicable to multi-layered dielectric film-coated microlens arrays, transmission gratings, Fresnel lenses and others of high moisture resistance.

What is claimed is:

1. An optical device comprising:
   a solid composition layer having a predetermined protrusion or groove surface profile on a surface thereof, wherein said solid composition layer is resin; and
   a multi-layered dielectric film coating the surface of the solid composition layer,
   wherein the solid composition layer is constituted by a layer formed by providing at least one of heat or UV light to a fluid composition containing a polymerizable organic group on a substrate so as to polymerize and cure the fluid composition.

2. An optical device according to claim 1, wherein a glass transition temperature of the solid composition layer is not lower than 100° C.

3. The optical device as claimed in claim 2, wherein the glass transition temperature of the solid composition is not lower than 150° C.

4. The optical device as claimed in claim 2, wherein the glass transition temperature of the solid composition is not lower than 200° C.

5. An optical device according to claim 1, wherein a linear thermal expansion coefficient of the solid composition layer is not larger than 190 ppm/° C.

6. The optical device as claimed in claim 5, wherein the linear thermal expansion coefficient of the solid composition is at most 170 ppm/° C.

7. The optical device as claimed in claim 6, wherein the linear thermal expansion coefficient of the solid composition is at most 150 ppm/° C.

8. An optical device according to claim 1, wherein a weight reduction in the solid composition layer when heated at a temperature not higher than the glass transition temperature thereof is not larger than 1.3% by weight.

9. The optical device having a predetermined surface profile as claimed in claim 8, wherein the weight reduction in the solid composition layer is at most 1.0% by weight.

10. The optical device having a predetermined surface profile as claimed in claim 8, wherein the weight reduction in the solid composition layer is at most 0.7% by weight.

11. The optical device as claimed in claim 1, wherein the polymerizable organic group is an epoxy group.

12. The optical device as claimed in claim 11, wherein the fluid composition contains the following components (A), (B), (C) and (D) in the ratio indicated below:

| (A) | non-fluorinated epoxy compound | 20 to 99.9% by weight, |
|---|---|---|
| (B) | polymerization initiator | 0.1 to 7% by weight, |
| (C) | fluorinated epoxy compound | 0 to 79.9% by weight, |
| (D) | silane coupling agent | 0 to 10% by weight. |

13. The optical device as claimed in claim 12, wherein the component (A) is an alicyclic epoxy compound.

14. The optical device as claimed in claim 1, wherein the polymerizable organic group is at least one selected from an acryloxy group, a methacryloxy group and a vinyl group.

15. The optical device as claimed in claim 1, wherein the multi-layered dielectric film includes at least two layers formed with, as an essential ingredient thereof, a material selected from $SiO_2$, $TiO_2$, $Ta_2O_5$, $ZrO_2$, $Nb_2O_5$ and $MgF_2$.

16. The optical device as claimed in claim 15, wherein a thickness of each layer of the multi-layered dielectric film falls between 1 and 600 nm.

17. The optical device as claimed in claim 15, wherein a grain mass or a columnar structure existing in the multi-layered dielectric film has a diameter of smaller than 10 nm.

18. The optical device as claimed in claim 1, wherein the substrate includes at least one selected from glass, ceramics, metal and resin.

19. The optical device as claimed in claim 1, of which the predetermined protrusion or groove surface profile functions as a transmission grating, a Fresnel lens or a microlens array.

20. The optical device of claim 1 wherein said predetermined protrusion or groove surface profile includes protrusions of spherical, conical or angular conical profile.

21. The optical device of claim 1 wherein said predetermined protrusion or groove surface profile includes linear slits, curved slits, concentric circles or lattices.

22. An optical device comprising:

a solid composition layer having a predetermined protrusion or groove surface profile on a surface thereof, wherein said solid composition layer is resin; and a multi-layered dielectric film coating the surface of the solid composition layer, wherein the surface of the solid composition layer polymerized and cured is coated with an $SiO_2$ film having a thickness of from 1 to 200 nm, forming the multi-layered dielectric film.

* * * * *